310-369 SR
2/3/87 XR 4,641,155

United States Patent [19]

Zoltan

[11] Patent Number: 4,641,155

[45] Date of Patent: Feb. 3, 1987

[54] PRINTING HEAD FOR INK JET PRINTER

[75] Inventor: Steven I. Zoltan, Brookfield, Conn.

[73] Assignee: Advanced Color Technology Inc, Chelmsford, Mass.

[21] Appl. No.: 761,860

[22] Filed: Aug. 2, 1985

[51] Int. Cl.[4] .................... G01D 15/18

[52] U.S. Cl. .................... 346/140 R; 310/369

[58] Field of Search .................... 346/140; 310/369

[56] References Cited

U.S. PATENT DOCUMENTS

| | | | |
|---|---|---|---|
| 3,683,212 | 8/1972 | Zoltan | 346/140 X |
| 3,832,579 | 8/1974 | Arndt | 346/140 X |
| 4,095,237 | 6/1978 | Amberntsson | 346/140 |
| 4,387,383 | 6/1983 | Sayko | 346/140 |
| 4,392,145 | 7/1983 | Parkola | 346/140 |
| 4,550,325 | 10/1985 | Viola | 346/140 |

*Primary Examiner*—Joseph W. Hartary
*Attorney, Agent, or Firm*—E. Thorpe Barrett

[57] ABSTRACT

A mechanically balanced pulsed ink droplet mechanism includes a disk or ring of piezoelectric ceramic material positioned within a metal ring of rectangular cross section having an annular channel in its inner surface that is sealed by a thin metal diaphragm to form an annular ink chamber. The piezoelectric transducer is in mechanical engagement with the inner surface of the annular diaphragm, but the ink is electrically insulated from the ceramic. A voltage pulse applied to opposite sides of the disk causes it to expand and eject a droplet of ink from the printing orifice.

The ink chamber is shallow and has a ratio of cross section to wetted perimeter or hydraulic radius approximately equal to the diameter of the orifice which quickly damps oscillations resulting from the ejection of each droplet of ink and permitting higher speed operation. The ink chamber is sealed without the use of compliant materials resulting in minimal additional compliance to the liquid. The construction causes the displacement produced by the transducer to be efficiently transmitted to the ink chamber, producing droplets with improved definition at greater efficiencies.

16 Claims, 6 Drawing Figures

PRINTING HEAD FOR INK JET PRINTER

BACKGROUND OF THE INVENTION

1. Field of the Invention

This invention relates to printing heads for ink jet printers and more particularly to a drop-on-demand printing head.

2. Brief Description of the Prior Art

Many varieties of ejection systems for ink drop printers have been devised in an effort to achieve higher speed of operation while providing uniform dimensions of the ink droplets. It is important that the ink droplets be precisely controlled in size and ejected with sufficient velocity that the imprint on the medium is sharp and positioned with great accuracy.

A pulsed drop ejection (drop-on-demand) system is functionally comparable to a subminiature reciprocating pump, although such print heads have frequently been considered from the standpoint of an acoustic system. Wave actions of the ink and resonances of the ink chamber analyzed on that basis, while ignoring the ink flow resulting from the pump action, can be misleading. Moreover, in a drop-on-demand system, the ink chamber is in a stable condition until the first droplet is ejected. If this is followed by the ejection of a series of droplets, a generally continual flow of ink through the chamber is necessary. This imparts the characteristics of a pump. In this construction, however, the usual piston-cylinder combination is replaced by a piezoelectric transducer acting on the ink in the chamber.

When a voltage pulse of proper polarity is applied to the transducer causing the piezoelectric material to expand radially, the resulting sudden decrease in volume of the ink chamber creates pressure that disrupts the meniscus at the ejection orifice causing the ejection of a droplet of ink. When the voltage pulse is reversed resulting in the expansion of the ink chamber, the meniscus immediately reforms and, if the increase in chamber volume takes place relatively slowly, by a more gradual change in the pulse voltage, the meniscus acts as a check valve preventing air from entering the chamber and allowing replen-ishment of the ink in the chamber through a feed line from the ink reservoir. The repetition of the ejection cycle must allow sufficient time for the chamber to reach substantially the identical starting condition as for the previous drop. Under these conditions, droplets of identical size and velocity are ejected.

U.S. Pat. No. 3,857,049 to Zoltan discloses a drop-on-demand print head using a transducer in which the perimiter of a disk of piezoelectric material projects into the ink chamber, which is in the form of an annular chamber around the disk. Seals to confine the ink in the chamber are formed by a pair of O-rings that engage the upper and lower surfaces of the piezoelectric disk. The edge portion of the piezoelectric disk is in direct contact with the ink. The O-rings are resilient and therefore limit the drop repetition speed.

Other types of print heads are illustrated by U.S. Pat. Nos. 2,512,743 to Hansell, and 4,387,383 to Sayko.

SUMMARY OF THE INVENTION

In the preferred embodiment, a pulsed ink droplet mechanism includes a disk or ring of piezoelectric ceramic material that is positioned within a metal casing having an annular channel in its inner surface that is sealed by a thin diaphragm, extending over one or more sides of the channel, to form an annular ink chamber. The piezoelectric material is in mechanical engagement with the inner surface of the annular diaphragm that forms the seal for the ink chamber, but the ink is electrically insulated from the piezoelectric material. The sudden removal of a voltage applied to the opposite sides of the ceramic disk causes the disk rapidly to expand radially and, acting through the diaphragm, decrease the volume of the ink chamber, rupture the meniscus, and force a droplet of ink from the printing orifice. The pulse voltage is reapplied more slowly allowing replacement ink to enter the chamber from the supply opening without causing a rupture of the meniscus and allowing air to enter the system.

An intake restrictor acts as a dynamic check valve. This constriction also assists in damping by dissipating the kinetic energy of the liquid rejected from the ink chamber through the input port. In the rest condition, there is substantially no pressure in the ink chamber. Consequently, the integral of the pressure time-product for each drop ejection cycle must be zero. Because the filling of the chamber requires a small negative pressure, its duration must be longer than the duration of the greater pressure required for the drop ejection. This pressure variation creates a flow reversal in the intake. If the flow is restricted at the intake with a device similar to the nozzle having a low inertance, the pressure drop caused by the kinetic energy of the moving liquid becomes the dominant factor. Because the kinetic energy is proportional to the square of the velocity, there is less liquid discharged toward the intake during the drop ejection than is taken in during the fill part of the cycle. The asymmetrical pressure pulse cycle thus creates a dynamic check valve at the intake of the restrictor.

The ink chamber is shallow, contains no resilient seals or walls, and has a large ratio of surface area to volume which quickly damps oscillations resulting from the ejection of each droplet of ink. The ink chamber has a ratio of cross section to wetted perimter or hydraulic radius approximately equal to the diameter of the orifice. Because the ink chamber is sealed without the use of compliant materials, more uniform droplets of higher definition are produced than when resilient materials are employed. This construction allows the effective displacement produced by the piezoelectric ceramic to be larger, in comparison with the volume of the ink chamber, than in previous systems, decreasing the elastic energy to be damped out and resulting in droplets with improved uniformity and definition at greater efficiencies.

The construction is mechanically balanced and of simple structure thereby minimizing the number of primary mechanical or structural resonances and eliminating complex resonances that result from asymmetrical arrangements.

This arrangement has a number of advantages over the earlier constructions. It permits the operation of drop-on-demand printing at relatively high speeds with uniform droplets that are ejected with sufficient velocity to follow a substantially linear path to the printing surface, permits more latitude in the selection of inks, and simplifies the construction of ink jet heads having multiple ejection orifices.

DESCRIPTION OF THE PREFERRED EMBODIMENT

In the various views generally similar parts are indicated by the same numerals followed by a differentiating letter.

Figure 1:
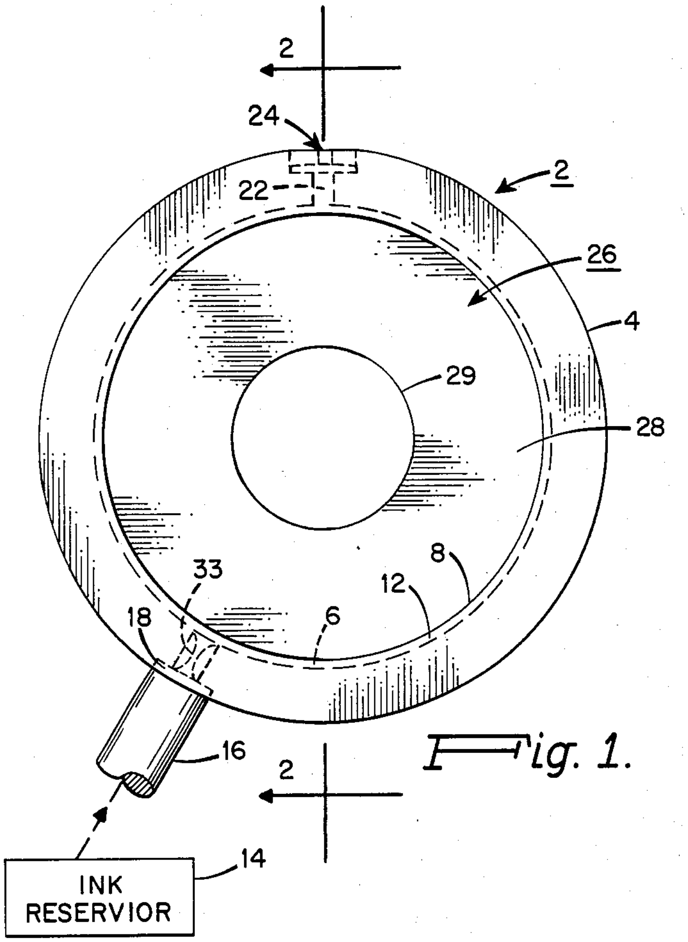
FIG. 1 is a plan view of an ink jet head embodying the invention.
Figure 2:
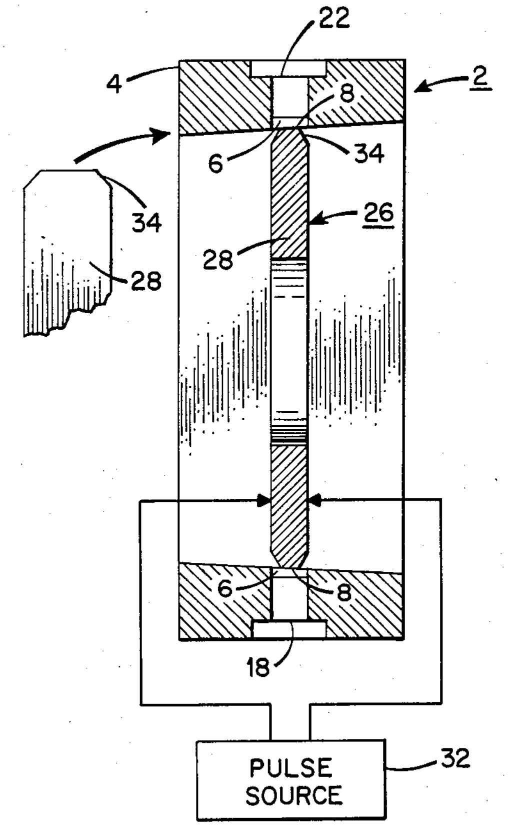
FIG. 2 is a sectional view along line 2—2 of FIG. 1.
Figure 3:
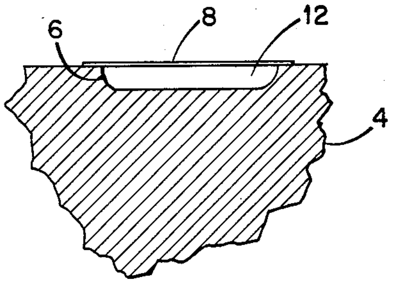
FIG. 3 is an enlarged partial sectional view through the annular channel forming the ink chamber.

As illustrated by FIGS. 1-3, the print head, generally indicated at 2, includes a ring-shaped housing 4, formed of brass or other suitable metal, which has an annular channel 6 in the inner surface. The channel 6 in combination with a diaphragm 8, formed of metal or plastic preferably with a thickness of approximately 0.001 inches, secured to the inner surface of the housing 4, forms an annular ink chamber 12 (FIG. 3).

Ink is supplied to the chamber 12 from an ink reservoir, diagrammatically illustrated at 14, through a conduit 16 that is connected to a port 18 that passes through the wall of the housing 4 into the chamber 12. Ink is expelled from the chamber 12 through a port 22 and is ejected through an orifice 24.

The ink chamber 12 can be considered as defined by a first wall section, formed by the body of the housing itself, and a second wall section formed by the diaphragm 8, which is flexible and much thinner than the other wall section.

A piezoelectric transducer, generally indicated at 26, formed by a disk 28 of piezoelectric material and plateds on each side with silver or other suitable electrode material. The disk 28 is positioned within the open central area of the housing 4 and makes mechanical contact around its perimeter with the annular diaphragm 8. Known adhesives may be used to secure the diaphragm 8 to the adjacent walls of the annular chamber, or the construction process may be as described in the copending application of Peter Duffield, Dave Hudson and Steven Zoltan, entitled Method for Manufacturing Ink Jet Printing Head, Ser. No. 06/761,857 filed of even date herewith, and assigned to the same assignee as the present application. The transducer disk 28 may be solid or, for convenience in assembly, may have a central opening 29, which preferably has a diameter no greater than one-half that of the disk. The piezoelectric transducer 26 is energized in the usual way by the application of pulse voltage to the two transducer electrodes as indicated diagrammatically in FIG. 2.

When a voltage pulse is applied to the electrodes from a pulse source, indicated diagrammatically at 32, the piezoelectric material expands radially and forces the diaphragm 8 outwardly to reduce the volume of the ink chamber 12. This sudden reduction in the volume of the ink chamber causes the ink to overcome the meniscus forces at the orifice 24 and eject one drop of ink.

However, in order to avoid depoling the piezoelectric material, it is preferred to maintain a static voltage, of the proper polarity, between the transducer electrodes to retain the disk 28 in its contracted state. Sudden removal of the applied voltage creates a rapid radial expansion of the piezoelectric material and a correspondingly rapid decrease in the volume of the ink chamber 12 rupturing the meniscus at the orifice 24 and ejecting one droplet of ink. As the voltage is reapplied at a slower rate, causing a radial contraction of the piezoelectric material and increasing the volume of the ink chamber, the meniscus immediately reforms and serves as a check valve causing the ink to be drawn into the chamber through the port 18.

The port 18 preferably includes a constriction 33 that has an opening approximately equal to the size of the opening in the orifice 24.

If the diaphragm 8 is formed of metal, which is the preferred construction, it is necessary to electrically isolate the electrodes from the metal diaphragm. For this reason, the disk 28 is chamfered around its perimeter, as indicated at 34 in FIG. 2, to prevent the silver electrode coatings on the disk 28 from making contact with the diaphragm.

The inlet and outlet ports may be positioned on opposite sides of the ink chamber 12 with acceptable operating results. However, it is preferred to place the ports in asymmetrical positions. Simple resonances within the chamber are less likely to cause problems with the asymmetrical arrangement and the stacking of multiple print heads for color printing is facilitated.

Figure 6:
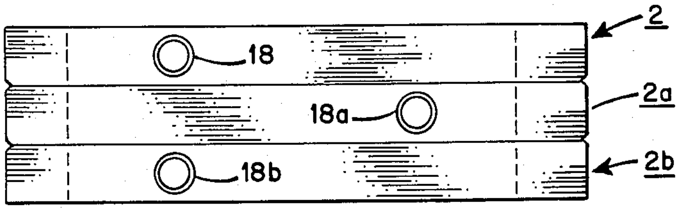
FIG. 6 is an elevational view showing three of the heads in stacked arrangement for use in multi-color printing.

In this example, the port 18 is displaced 30 degrees from a point directly opposite the port 22. When the heads are stacked, every other head is positioned with the opposite side up so that from a front view the heads appear as in FIG. 6. The connection to the port 18 is made as shown. On the adjacent head 2*a*, the port 18*a* is displaced 60 degrees from the port 18 making it easier to connect the small ink conduits to the ports. The bottom head 2*b* has the same orientation as the head 2 and is provided with additional clearance because of the intervening head 2*a*.

Figure 4:
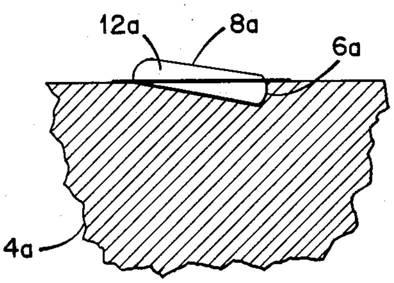
FIGS. 4 and 5 are views similar to FIG. 3 showing alternate cross sectional shapes for the ink chamber.

The ink chamber housing shown in FIGS. 1 and 3 is substantially rectangular in cross section, but other cross sections may be used. FIG. 4 illustrates, for example, a chamber 12*a* defined by a first wall section having two sides formed by the body of the housing 4*a* and a second wall section which is formed by the diaphragm 8*a* which is shaped in the form of a reflection of the channel 6*a*.

Figure 5:
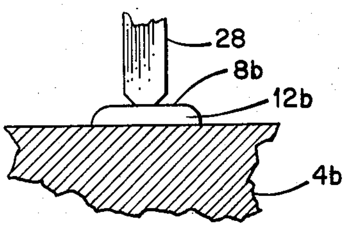

FIG. 5 shows an ink chamber 12*b* in which a first wall section of the chamber is formed by a plane surface of the housing 4*b* and the second wall section is formed by the diaphragm 8*b* which in this example is generally dome shaped in cross section.

It is desirable that the ink chamber have a very small volume and that it have a rigid structure to insure prompt response to the application of the compressive movement of the diaphragm 8. In the construction of FIG. 1, the inner diameter of the housing 4 is 0.288 inches and the horizontal thickness of the housing is about 0.04 inches. The channel 6 has a depth of about 0.004 inches and a width of 0.028 inches.

The high ratio of width to height of the cross section dimensions of the ink chamber, in this case about 7 to 1, results in a large surface area relative to volume. A ratio of width to height of at least four is to be preferred. This large wall area aids in damping any oscillations or resonance movements of the ink within the chamber 6.

I claim:

1. An ink jet printer head system comprising
a printer head having
a housing having therein an annular channel,
an annular diaphragm secured to said housing and forming with said channel an annular ink reservoir, said housing including an inlet port and an outlet orifice each communicating with said reservoir, and a piezoelectric transducer comprising piezoelectric material having an annular surface in mechanical engagement with said diaphragm, and first and second electrodes on opposite sides of said piezoelectric material.

2. A print head system as claimed in claim 1 wherein said inlet port and said outlet orifice are positioned asymmetrically on said housing with respect to said annular channel.

3. A print head system as claimed in claim 1 including at least two of said print heads positioned in parallel displaced planes, and wherein said inlet ports of said heads are displaced from each other in planes perpendicular to said displaced planes of said print heads.

4. A print head system as claimed in claim 1 wherein said piezoelectric material is a disk.

5. A print head system as claimed in claim 4 wherein said disk has a central opening having a diameter less than approximately one-half the diameter of said disk.

6. A print head system as claimed in claim 1 including drop-ejection control means comprising means applying a steady state voltage to opposite surfaces of said piezoelectric material of such polarity as to maintain said disk in its contracted state, means arranged to rapidly decrease said voltage thereby to cause the ejection of one droplet of ink, and means arranged to more slowly increase said voltage to said steady state voltage thereby to draw replacement ink into said reservoir.

7. A print head system as claimed in claim 1 wherein said piezoelectric material is in the form of a disk having conductive coatings on opposing surfaces thereof, the annular surface of said disk being chamfered thereby to prevent electrical contact between said conductive coatings and said diaphragm.

8. A printer head system as claimed in claim 1 wherein the hydraulic radius of said reservoir is approximately equal to the diameter of said orifice.

9. A printer head system as claimed in claim 8 wherein said inlet port and said outlet orifice are positioned asymmetrically on said housing with respect to said annular channel.

10. A printer head system as claimed in claim 9 including at least two of said print heads positioned in parallel displaced planes, and wherein said inlet ports of said heads are displaced from each other in planes perpendicular to said displaced planes of said print heads.

11. A printer head system as claimed in claim 1 wherein said ink reservoir has a ratio of width to depth of at least four.

12. An ink jet printer head comprising a source of ink, a housing having an annular groove in the internal surface thereof, an annular diaphragm secured to said housing and arranged to seal said groove to form an annular ink chamber, first conduit means connecting said source of ink with said annular chamber, an ink ejection orifice, second conduit means connecting said ink chamber with said ejection orifice, a piezoelectric transducer having a circular perimeter, means supporting said transducer with its perimeter in mechanical engagement with said diaphragm, and means for applying successive voltage pulses to said transducer thereby to cause the ejection of a series of separate ink droplets from said orifice.

13. Apparatus as claimed in claim 12 wherein said diaphragm has a thickness of about 0.001 inches.

14. Apparatus as claimed in claim 13 including means electrically insulating said transducer from said diaphragm.

15. Apparatus as claimed in claim 12 wherein said ink chamber has a width at least four times its depth.

16. In an ink jet head for drop-on-demand operation the combination comprising a ring-shaped housing having first and second wall sections together defining an annular chamber, said second wall section being substantially thinner than said first wall section and arranged to operate as a driving diaphragm for the ink in said chamber, a piezoelectric transducer having a circular perimeter positioned in mechanical engagement with said second wall section of said housing, an inlet port for admitting ink into said chamber, an outlet orifice for expelling ink from said chamber, and means for applying a voltage pulse to opposite surfaces of said transducer.

* * * * *